United States Patent
Marumo et al.

(10) Patent No.: US 8,125,767 B2
(45) Date of Patent: Feb. 28, 2012

(54) COATED ELECTRODE AND ORGANIC ELECTROLYTE CAPACITOR

(75) Inventors: Chisato Marumo, Hokuto (JP); Kenichi Matsumoto, Hokuto (JP); Yuka Toyomasu, Hokuto (JP); Makoto Ohshima, Hokuto (JP)

(73) Assignee: JM Energy Corporation, Hokuto (JP)

( * ) Notice: Subject to any disclaimer, the term of this patent is extended or adjusted under 35 U.S.C. 154(b) by 373 days.

(21) Appl. No.: 12/519,289

(22) PCT Filed: Dec. 26, 2007

(86) PCT No.: PCT/JP2007/074967
§ 371 (c)(1),
(2), (4) Date: Jun. 15, 2009

(87) PCT Pub. No.: WO2008/078777
PCT Pub. Date: Jul. 3, 2008

(65) Prior Publication Data
US 2010/0027193 A1 Feb. 4, 2010

(30) Foreign Application Priority Data
Dec. 27, 2006 (JP) ................................. 2006-350978

(51) Int. Cl.
*H01G 9/00* (2006.01)
(52) U.S. Cl. ........ 361/502; 361/503; 361/504; 361/512; 361/509; 361/529

(58) Field of Classification Search .................. 361/502, 361/503–504, 509, 512, 303–305, 516–519, 361/523–525, 528–529, 531–532
See application file for complete search history.

(56) References Cited

U.S. PATENT DOCUMENTS
5,120,404 A * 6/1992 Okabayashi et al. ......... 205/139
(Continued)

FOREIGN PATENT DOCUMENTS
JP 8-264391 10/1996
(Continued)

OTHER PUBLICATIONS
"Aluminium" Wikipedia, The Free Encyclopedia. pp. 1-4. http://en.wikipedia.org/wiki/Aluminium.

*Primary Examiner* — Nguyen T Ha
(74) *Attorney, Agent, or Firm* — Oblon, Spivak, McClelland, Maier & Neustadt, L.L.P.

(57) ABSTRACT

A coated electrode includes a current collector of an etched aluminum foil having a thickness of 20 to 45 μm, an apparent density of 2.00 to 2.54 g/cm$^3$, an air permeability of 20 to 120 s and a number of through-holes penetrating therethrough from the front surface to the back surface, and an electrode layer formed by applying a coating material including, as an active material, a substance capable of reversibly carrying lithium ions and anions on to the current collector. The coated electrode is industrially producible, high in conductivity and strength, and excellent in evenness. A capacitor, for example, can make use of the electrode.

8 Claims, 3 Drawing Sheets

U.S. PATENT DOCUMENTS

| | | | | |
|---|---|---|---|---|
| 6,099,709 A * | 8/2000 | Tanahashi et al. | | 205/50 |
| 6,307,733 B1 * | 10/2001 | Maruyama et al. | | 361/511 |
| 6,346,127 B1 * | 2/2002 | Kuriyama | | 29/25.03 |
| 6,462,935 B1 * | 10/2002 | Shiue et al. | | 361/511 |
| 6,519,137 B1 * | 2/2003 | Nitta et al. | | 361/525 |
| 6,870,728 B1 * | 3/2005 | Burket et al. | | 361/538 |
| 7,457,103 B2 * | 11/2008 | Yoshida et al. | | 361/523 |
| 7,656,647 B2 * | 2/2010 | Edson et al. | | 361/540 |

FOREIGN PATENT DOCUMENTS

| | | |
|---|---|---|
| JP | 2005 129924 | 5/2005 |
| WO | 2004 097867 | 11/2004 |
| WO | 2006 112068 | 10/2006 |

* cited by examiner

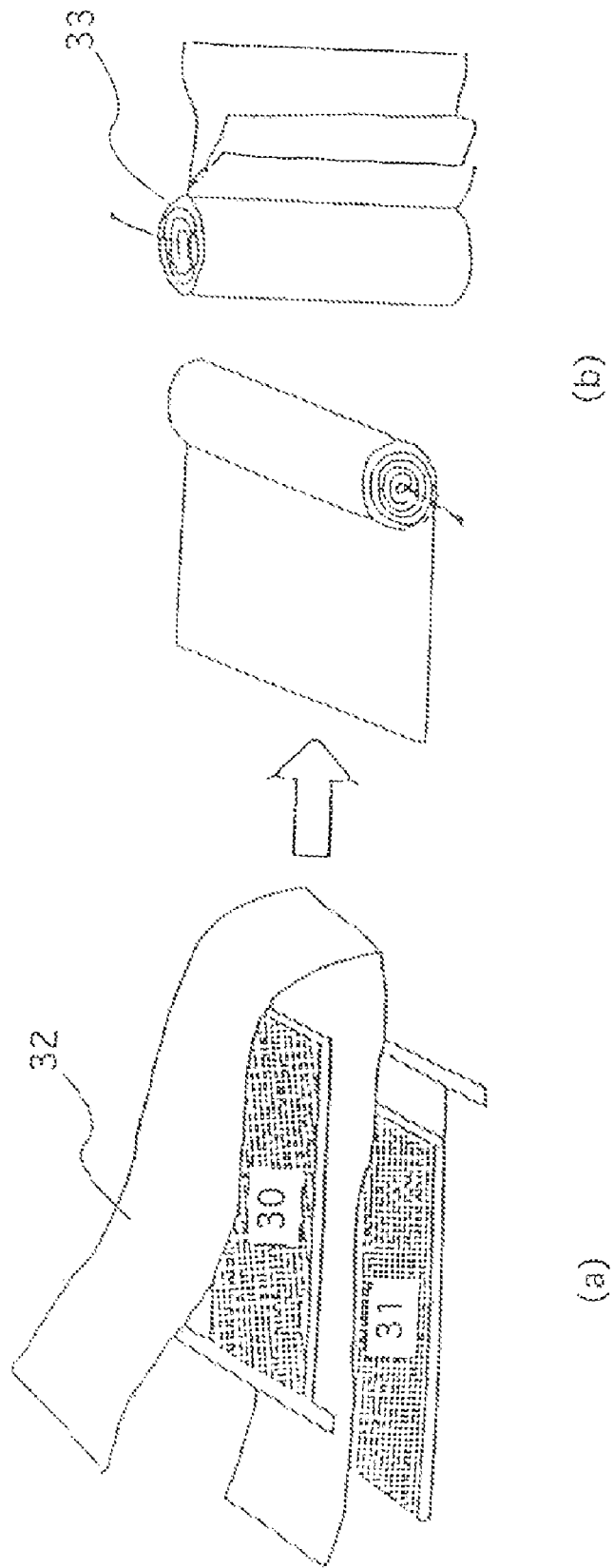

COATED ELECTRODE AND ORGANIC ELECTROLYTE CAPACITOR

TECHNICAL FIELD

The present invention relates to a coated electrode and an organic electrolyte capacitor making use of the electrode and having a high energy density and a high power density. In particular, the invention relates to a coated electrode with an electrode layer formed on a current collector having a great number of through-holes penetrating therethrough from the front surface to the back surface, and an organic electrolyte capacitor making use of the coated electrode, having a high energy density and a high power density and accompanied by transfer of lithium ions.

BACKGROUND ART

In recent years, developments of storage and supply systems of clean energy by solar photovoltaic power generation or wind power generation and new power source systems such as power sources used in electric vehicles and hybrid electric vehicles have been vigorously conducted. Although a lead battery, a nickel-cadmium battery and the like have heretofore been widely used as storage batteries in such new power source systems, that having a high energy density and a high power density has come to be required as a power source taking the place of these batteries.

Attention is paid to a lithium-ion battery and an electric double layer capacitor as storage power sources or driving power sources meeting such a requirement. However, the lithium-ion battery involves a problem in points of power characteristics, cycle life and safety though the energy density thereof is high.

On the other hand, since the electric double layer capacitor is excellent in power characteristics and has a long life withstanding charge and discharge over tens of thousands of cycles though the discharge capacity thereof is small compared with the battery, it is widely used as a power source for memory backup in portable telephones, digital cameras and the like. However, the energy density of a general electric double layer capacitor is of the order of 3 to 5 Wh/l and small by about two figures compared with the lithium-ion battery. Therefore, its practical use as a driving power source for hybrid electric vehicles or the like, of which an energy density of at least 10 to 20 Wh/l is required, is not developed under the circumstances.

As a storage power source meeting uses, of which a high energy density and high power characteristics are required, there has recently been proposed, as an organic electrolyte storage battery accompanied by transfer of lithium ions, an organic electrolyte capacitor using a positive-electrode current collector and a negative-electrode current collector each having holes penetrating therethrough from the front surface to the back surface, and a negative-electrode active material capable of reversibly carrying lithium, wherein a negative electrode is electrochemically brought into contact with lithium arranged oppositely to the negative electrode, thereby carrying the lithium on the negative-electrode active material (see Patent Arts. 1 and 2).

Patent Art. 1: International Publication No. WO/2003/003395, pamphlet
Patent Art. 2: International Publication No. WO/2005/031773, pamphlet In such an organic electrolyte capacitor, the holes penetrating therethrough from the front surface to the back surface are provided in the current collector, whereby the lithium ions can be transferred between the front and back surfaces of the electrode without being intercepted by the electrode current collector. Therefore, in a cell structure having many stacked layers, the lithium ions can be electrochemically carried on not only a negative electrode arranged in the vicinity of the lithium, but also a negative electrode arranged away from the lithium through the through-holes.

As the current collector used in this organic electrolyte capacitor, is mentioned a porous metal foil having holes penetrating therethrough from the front surface to the back surface, for example, an expanded metal, a punching metal, a metal mesh, a foam or a porous etched foil with through-holes imparted by etching.

From the viewpoints of electrochemical characteristics and weight saving, it is investigated to use, as a positive-electrode current collector, an expanded metal, punching metal, electrolytically etched foil, chemically etched foil or the like worked from an aluminum base material, and on one hand, it is investigated to use, as a negative-electrode current collector, an expanded metal, punching metal, electrolytically etched foil, chemically etched foil or the like worked from a base material such as stainless steel, copper or nickel.

DISCLOSURE OF THE INVENTION

However, the use of the expanded metal made of aluminum as the positive-electrode current collector has involved a problem that the base material is broken or deformed by tension in a coating process or slitting process because the strength of the base material is low.

The expanded metal, punching metal or the like made of aluminum has also involved a problem that when an electrode coating material is directly applied to the base material, the contact resistance with the base material becomes high because an oxide film is formed on the surface of the porous base material, so that an electrode low in electric resistance cannot be produced.

In the conventional chemically etched aluminum foil, it has been difficult to industrially produce a porous foil having fine through-holes and a thickness less than 100 µm, and consequently a chemically etched aluminum foil having a thickness of 100 µm or more has permitted only producing a current collector low in air permeability (low in penetrability).

As described above, an electrode obtained by coating the conventional industrially producible porous metallic current collector, for example, the current collector having holes penetrating therethrough from the front surface to the back surface, such as the expanded metal, is low in tensile strength, easy to cause foil break and low in yield compared with a nonporous metal foil electrode having an equal thickness with the porous electrode. Therefore, it has been necessary to control a coating speed low so as to prevent the base material from being broken during the coating. As a result, there has been a problem that productivity is lowered.

In addition, the production of the electrode must go through a step of priming a conductive layer for lowering the electric resistance of the resulting electrode and coating an electrolytic coating material on the conductive layer. Therefore, there has been a problem that processing steps are increased to be complicated.

The present invention has been made in view of the above problems and has as its object the provision of a coated electrode that is industrially producible, high in conductivity and strength and excellent in evenness.

Another object of the present invention is to provide an organic electrolyte capacitor, which is high in energy density, high in power, low in resistance and accompanied by transfer of lithium ions, by using the electrode.

In order to achieve the above objects, the present invention provides a coated electrode comprising a current collector composed of an etched aluminum foil having a thickness of 20 to 45 μm, an apparent density of 2.00 to 2.54 g/cm$^3$, an air permeability of 20 to 120 s and a great number of through-holes penetrating therethrough from the front surface to the back surface, and an electrode layer formed by applying a coating material containing, as an active material, a substance capable of reversibly carrying lithium ions and anions on to the current collector.

In the coated electrode according to the present invention, at least 80% of the through-holes in the current collector may preferably have a hole diameter of 1 to 30 μm.

In the coated electrode according to the present invention, it may be preferable that the electrode layer has a thickness of 20 to 200 μm and is formed on one or both surfaces of the current collector.

In the coated electrode according to the present invention, the coating material may preferably contain an aqueous binder.

The present invention also provides an organic electrolyte capacitor comprising a positive electrode, a negative electrode and an electrolyte capable of transferring lithium ions, wherein the positive electrode is composed of the above-described coated electrode, and the negative electrode has a current collector containing, as a negative-electrode active material, a substance capable of reversibly carrying lithium ions and having a great number of through-holes penetrating therethrough from the front surface to the back surface, and a negative-electrode active material layer formed on the current collector, whereby lithium is electrochemically carried on the negative electrode.

In the organic electrolyte capacitor according to the present invention, an electrolyte solution containing the electrolyte may preferably be an aprotic organic solvent solution of a lithium salt.

The organic electrolyte capacitor according to the present invention may be constructed by stacking electrode pairs each composed of the positive electrode and the negative electrode.

The organic electrolyte capacitor according to the present invention may be constructed by winding, electrode pairs each composed of the positive electrode and the negative electrode.

BRIEF DESCRIPTION OF THE DRAWINGS

[FIG. 3] schematically illustrates an electrode unit of an organic electrolyte capacitor according to another embodiment of the present invention by winding a positive and negative electrodes.

DESCRIPTION OF CHARACTERS

Figure 1:
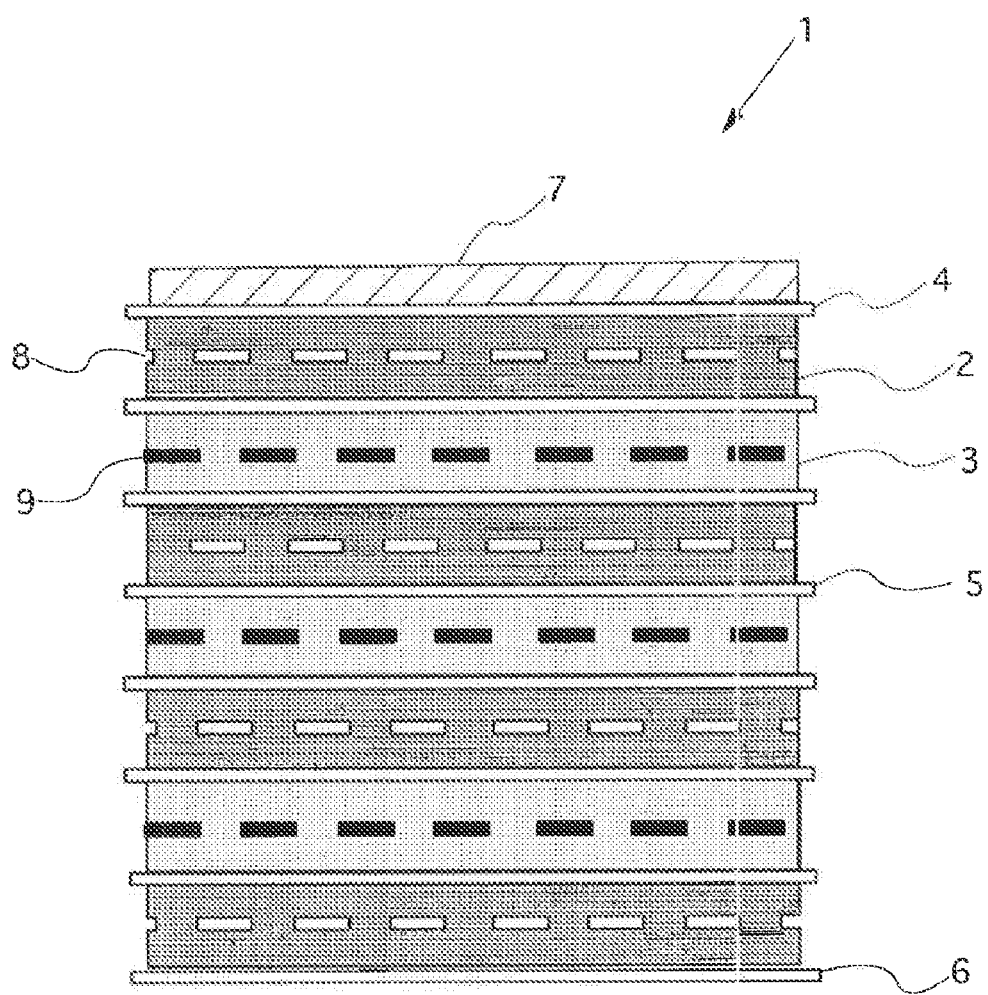
[FIG. 1] illustrates the construction of an electrode unit of an organic electrolyte capacitor according to an embodiment of the present invention.

1 Electrode unit
2 Negative electrode
3 Positive electrode
4, 5, 6 Separator
7 Lithium foil
8 Negative-electrode current collector
9 Positive-electrode current collector
20, 21 Laminate film
22, 23 Terminal
30 Positive electrode
31 Negative electrode
32 Separator
33 Unit

BEST MODE FOR CARRYING OUT THE INVENTION

The present invention will hereinafter be described in detail. The coated electrode, which is a first invention of the present invention, and a production process thereof will be first described, and a capacitor using the coated electrode, which is a second invention of the present invention, will be then described. Preferred embodiments of the present invention will hereinafter be described. However, the present invention is not limited thereto.

1. Coated Electrode

The coated electrode according to the present invention comprises a current collector composed of an etched aluminum foil having a thickness of 20 to 45 μm, an apparent density of 2.00 to 2.54 g/cm$^3$, an air permeability of 20 to 120 s and a great number of through-holes penetrating therethrough from the front surface to the back surface, and an electrode layer formed on the front surface or front and back surfaces of the current collector, and the electrode layer is formed by applying a coating material containing, as an active material, a substance capable of reversibly carrying lithium ions and anions.

The etched foil used as the current collector may be either a hard foil or a soft foil. However, the hard foil is preferred to the soft foil in that deformation is hard to be left in a coating process.

The thickness of the etched foil is 20 to 45 μm, preferably 20 to 40 μm, more preferably 20 to 35 μm.

The tensile strength of the etched foil is 20 to 250 N/mm$^2$, preferably 40 to 200 N/mm$^2$, more preferably 60 to 200 N/mm$^2$.

If the etched foil is too thick, the whole electrode becomes thick, and the amount of the active material occupied in the whole electrode is lowered, so that not only the energy density or power density of the resulting capacitor is lowered, but also workability in the coating process is lowered. If the thickness of the etched foil is too thin on the other hand, the strength of the resulting electrode is lowered, which forms the cause of base break, so that yield in the coating process is lowered. Accordingly, the present inventors have carried out extensive researches repeatedly. As a result, the present inventors have been led to gain the above-described optimum values.

The apparent density of the etched foil is 2.00 to 2.54 g/cm$^3$, preferably 2.30 to 2.54 g/cm$^3$.

If the apparent density of the etched foil is too high, the transfer speed of lithium ions passing through the through-holes becomes slow, and so such a too high apparent density is not preferred. If the apparent density of the etched foil is too low on the other hand, the strength of the etched foil is lowered, and so such a too low apparent density is not preferred.

The air permeability of the etched foil is 20 to 120 s, preferably 20 to 60 s.

If the air permeability of the etched foil is too high, the strength of the etched foil is lowered, and so such a too high air permeability is not preferred. In addition, in some cases, only a liquid component may pass through the through-holes upon coating to cause phase separation and lower workability. If the air permeability of the etched foil is too low on the other hand, the transfer speed of lithium ions passing through the through-holes becomes slow, and so such a too low air permeability is not preferred.

A proportion of through-holes having a hole diameter of 1 to 30 μm among the through-holes in the etched foil is preferably 80% or more of all the through-holes, more preferably 85% or more.

If this proportion is lower than 80%, the transfer speed of lithium ions passing through the through-holes becomes slow, and so such a low proportion is not preferred.

The coating material for obtaining the electrode layer formed on the front surface or front and back surfaces of the current collector contains an active material and contains a conductive material and a binder as needed.

A positive-electrode active material may be any material so far as it can reversibly carry lithium ions and/or anions such as tetrafluoroborate. For example, various kinds of activated carbon obtained by using, as a raw material, coke, pitch, resin, coconut shell or a plant such as sawdust and activating the raw material with steam, carbon dioxide or potassium hydroxide, conductive polymers, polyacene type materials, and mesopore carbon, in which mesopores having a pore diameter of 2 to 50 nm are markedly developed, may be used though not limited thereto.

As the conductive material, may be used, for example, carbon black such as acetylene black or Ketjen black, or a carbonaceous material such as graphite though not limited thereto.

A mixing ratio of the conductive material varies according to the electric conductivity of the active material, the form of the resulting electrode and the like and is preferably 2 to 20% by weight based on the active material.

The binder may be any binder so far as it is insoluble in an organic electrolyte solution, which will be described subsequently. For example, an aqueous resin using water as a dispersion medium or solvent, or a non-aqueous resin using an organic solvent such as alcohol or N-methylpyrrolidone as a dispersion medium or solvent may be used though not limited thereto. Specifically, SBR type binder resins, carboxymethyl cellulose type resins and the like are included in the aqueous resins, and phenol resins and melamine resins may be used as either the aqueous resins or the non-aqueous resins according to their compositions. Acrylic resins, polyamide resins, polyethylene resins and the like may be used as the aqueous resins by emulsifying them. As typical non-aqueous resins, may also be used fluorine-containing resins such as polytetrafluoroethylene and polyvinylidene fluoride, polyimide resins and polyamide-imide copolymer resins.

A mixing ratio of the binder resin is 1 to 20% by weight, preferably 2 to 10% by weight, more preferably 2 to 8% by weight based on the active material.

In a preferred embodiment, the thickness of the electrode layer is 20 to 200 μm, preferably 30 to 100 μm, more preferably 40 to 80 μm in one surface. The thickness of the positive electrode layer is suitably designed with a balance with the thickness of the negative electrode layer in such a manner that the energy density of the capacitor cell can be ensured. As the thickness of the positive electrode layer is made smaller, the active material can be more effectively used, and there is a merit that power density can be improved. However, if the thickness is too small, the energy density of the capacitor cell is lowered, and so such a too small thickness is not preferred. It is also necessary to take industrial productivity into consideration. Thus, the present inventors have carried out extensive researches repeatedly. As a result, it has been found that the above-described thickness is favorable.

The production process of the coated electrode according to the present invention will now be described.

The coated electrode according to the present invention is obtained by applying a coating material containing, as an active material, a substance capable of reversibly carrying lithium ions and/or anions on to a current collector composed of an etched aluminum foil having a great number of through-holes. More specifically, the coated electrode is obtained through a process of electrolytically etching a raw aluminum foil, thereby producing a current collector and a process of directly applying a coating material containing, as an active material, a substance capable of reversibly carrying lithium ions and anions on to the front surface of the resultant current collector, thereby forming an electrode layer.

The raw aluminum foil used in the electrolytically etching process is, for example, a soft foil or hard foil having a width of about 500 mm, a thickness of about 20 to 60 μm and a purity of about 99.99% though not limited thereto. Prior to subjecting the raw aluminum foil to electrolytic etching, the raw aluminum foil is preferably subjected to a pretreatment for homogenizing the surface condition thereof by degreasing or removal of a spontaneous oxide film. As this pretreatment, may be used a treatment such as degreasing with trichloroethylene, alkali washing, mineral acid treatment or washing by alternating current or cathode electrolysis. After such a treatment, the raw aluminum foil is fully washed with pure water.

The raw aluminum foil subjected to the pretreatment is immersed in a bath of an etchant composed of an aqueous solution of a chloride such as hydrochloric acid or common salt and subjected to electrolytic etching by using a direct current or alternating current or alternately using them. The degree of progress of the electrolytic etching and the form of holes formed by etching are affected by parameters such as hardness of the foil, temperature, etchant concentration, pH, the kind of an electric current used, current density, quantity of electricity applied and electrode structure, and such parameters are controlled, whereby desired air permeability and hole diameter can be achieved. For example, a soft aluminum foil even in crystal orientation is used to conduct direct current etching, whereby an etched foil with through-holes having a small hole diameter aligned in a depth-wise direction can be obtained.

Powdered aluminum, chloride ions and impurities are attached on the surfaces of the aluminum foil by the electrolytically etching process. These are removed by a purification treatment with nitric acid or the like, and the aluminum foil is then fully washed with pure water.

The etched aluminum foil thus obtained comes to have a thickness of 20 to 45 μm, an apparent density of 2.00 to 2.54 $g/cm^3$ and an air permeability of 20 to 120 s, and the surface area thereof reaches about 20 to 100 times compared with the raw foil.

A coating material containing, as an active material, a substance capable of reversibly carrying lithium ions and anions is then directly applied on to the surface of the resultant etched aluminum foil.

As a coating method of this coating material, may be used, for example, a coating system by a vertical die coater, and coating can be conducted on one surface or both surfaces of the etched aluminum foil according to this method.

Attention should be paid to the fact that the above-described coating material can be directly applied on to the etched aluminum foil. In the conventional porous aluminum current collector composed of the expanded metal or punching metal made of aluminum, an oxide film is formed on the surfaces of the base material, so that a conductive layer containing a conductive material such as carbon has been first applied on to the porous aluminum current collector for enhancing the conductivity of the current collector, and the coating material has been applied on to the conductive layer. However, in the present invention, the etched foil has a thickness of 20 to 45 µm, an apparent density of 2.00 to 2.54 g/cm$^3$, an air permeability of 20 to 120 s and through-holes penetrating therethrough from the front surface to the back surface, and the oxide film on the surfaces thereof is removed or extremely thinned by the etching, so that high adhesion is achieved even when the coating material is directly applied on to the surface thereof, and contact resistance with the resulting electrode layer can be controlled low. Accordingly, such process of applying the conductive layer as in the past can be omitted, so that the present invention has succeeded in greatly shortening the production process.

In the present invention, when at least 80% of the through-holes in the etched aluminum foil have a hole diameter of 1 to 30 µm, the viscosity of the coating material can be suitably controlled in such a manner that the coating material does not pass through the through-holes in the coating process, so that the coating treatment may also be conducted by a coating system by a horizontal die coater or comma coater, or the like.

Since the etched foil used in the present invention is high in tensile strength compared with the conventional expanded metal having the samethickness, foil break is hard to occur during the coating treatment. In addition, since the hole diameter of the through-holes is smaller than that of the expanded metal, the uniformity of the electrode surface is also excellent. As a result, a coated electrode having high reliability can be produced.

2. Organic Electrolyte Capacitor

The organic electrolyte capacitor according to the present invention comprises, for example, a positive electrode composed of the above-described coated electrode, a negative electrode obtained by applying a coating material containing, as an active material, a substance capable of reversibly carrying lithium ions on to a front surface or front and back surfaces of a current collector composed of a foil of copper, stainless steel, nickel or the like and having through-holes penetrating therethrough from the front surface to the back surface, thereby forming an electrode layer, and a separator provided for preventing the positive electrode and the negative electrode from coming into direct contact with each other, and the interior of the capacitor is filled with an electrolyte solution capable of transferring lithium ions.

FIG. 1 illustrates the construction of an organic electrolyte capacitor according to an embodiment of the present invention. Positive electrodes 3 and negative electrodes 2 are stacked through separators 4, 5 and 6, thereby fabricating an electrode unit 1. A lithium foil 7 is arranged on an outermost portion of the electrode unit 1. In this embodiment, the lithium foil 7 is preferably stuck on a porous current collector having a great number of through-holes like the positive-electrode current collector and negative-electrode current collector. Such a lithium current collector is electrically connected to the negative electrodes in the interior or exterior of the capacitor.

When the lithium current collector is electrically connected to the negative electrodes in the interior of the capacitor, an electrolyte solution, which will be described subsequently, is poured, and all the negative electrodes come into electrochemical contact with the lithium current collector, and lithium ions are dissolved out of the lithium current collector into the electrolyte solution, smoothly transferred through the through-holes in negative-electrode current collectors 8 and positive-electrode current collectors 9 and carried on all the negative electrodes.

As the negative-electrode active material, may be used, for example, various kinds of carbon materials and carbon fibers obtained by using, as a starting material, graphite such as natural graphite or artificial graphite, coke, pitch, thermosetting resin, coconut shell or tree, polyacene type materials, tin oxides, and silicon oxides though not limited thereto. These materials are preferably subjected to carbonization or processing treatment under specific conditions for efficiently carrying out the transfer of lithium ions having a small diameter. A conductive material such as acetylene black, Ketjen black or graphite may be suitably added as needed.

The negative-electrode active material is processed into powder, granule, short fiber or the like, and then mixed with a binder resin and applied to the negative electrode, thereby forming a negative-electrode active material layer. As the binder resin, may be used an aqueous SBR resin or acrylic resin, a solvent-type polyvinylidene fluoride resin, or the like.

The electrolyte solution comprises an electrolyte and a solvent dissolving it. Conditions required of the electrolyte solution are that lithium ions can be transferred, no electrolysis is caused even under a high voltage, and lithium ions can be caused to stably exist. As such an electrolyte, is preferably a lithium salt such as LiI, LiClO$_4$, LiAsF$_6$, LiBF$_4$ or LiPF$_6$.

As the solvent, is preferably used, for example, an aprotic organic solvent such as ethylene carbonate, propylene carbonate, dimethyl carbonate, diethyl carbonate, γ-butyrolactone, acetonitrile, dimethoxy-ethane, tetrahydrofuran, dioxolane, methylene chloride or sulfolane, or a mixture of two or more solvents thereof though not limited thereto.

The electrolyte and solvent are mixed in a sufficiently dehydrated state to prepare an electrolyte solution. The concentration of the electrolyte in the electrolyte solution is controlled to at least 0.1 mol/l or more, preferably within a range of 0.5 to 1.5 mol/l for making the internal resistance of the electrolyte solution low.

Figure 2:
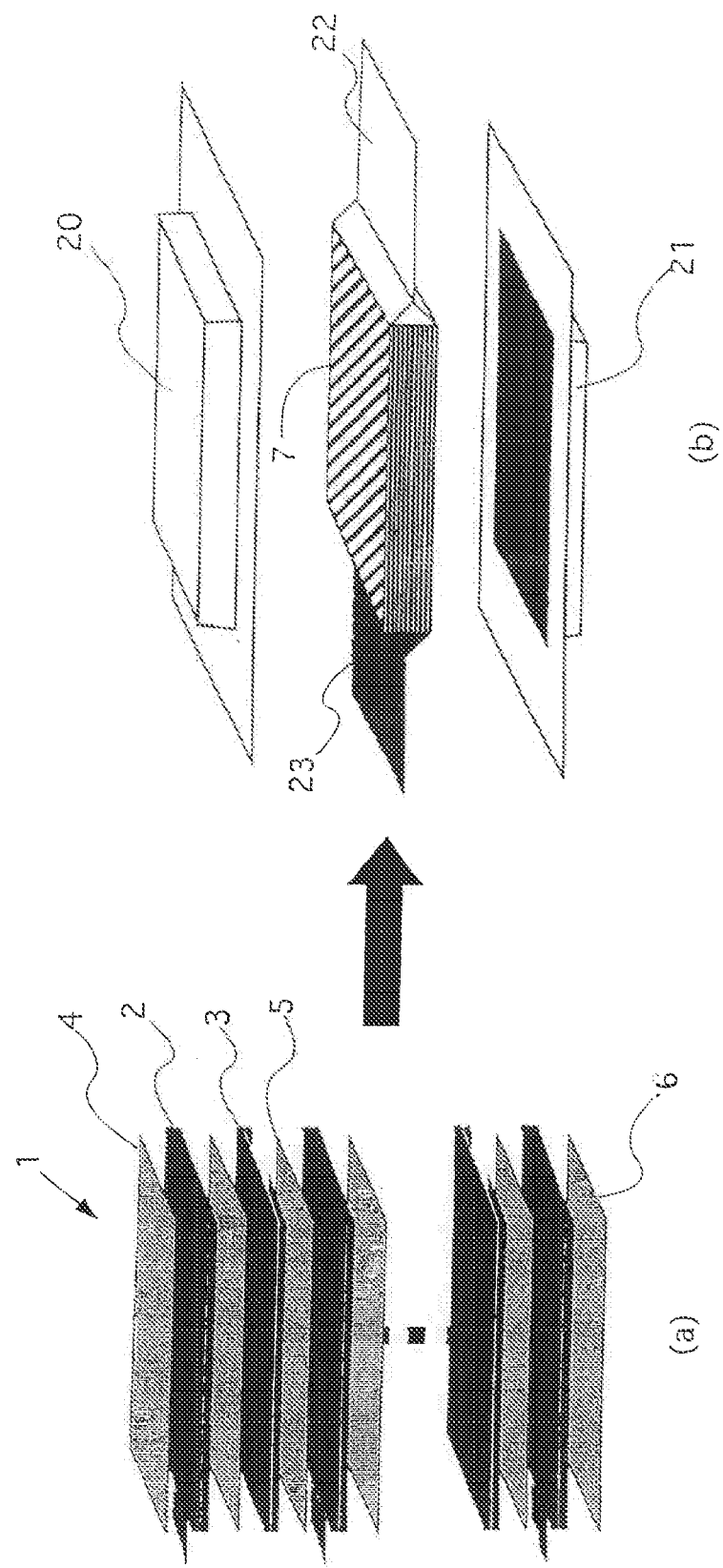
[FIG. 2] illustrates a structure that an electrode unit illustrated in FIG. 1 is sheathed with laminate films 20 and 21.

FIG. 2 illustrates a structure that the electrode unit illustrated in FIG. 1 is sheathed with laminate films 20 and 21. In FIG. 2, the same members as in FIG. 1 are indicated by the same characters. A terminal 22 connected to one ends of all the positive electrodes 3 and a terminal 23 connected to the other ends of all the negative electrodes 2 are provided so as to extend to the outside of a sheathing container. As a sheathing material, is preferably used a laminate film of aluminum and a polymeric material such as nylon or polypropylene from the viewpoints of miniaturization and weight saving of the resulting capacitor.

As the sheathing container of the organic electrolyte capacitor according to the present invention, may be used a metal case of iron, aluminum or the like, a plastic case or a composite case with such materials laminated on each other in addition to the aluminum-laminated film. No particular limitation is imposed on the form of the sheathing container, and the container may be optionally shaped into, for example, a cylindrical, box or flat plate form according to the use of the capacitor.

FIG. 3 schematically illustrates an organic electrolyte capacitor according to another embodiment of the present invention. A positive electrode 30 and a negative electrode 31 are wound together through a separator 32 to form a unit 33. This unit 33 is inserted into a sheathing container, and the container is filled with the above-described electrolyte solution and sealed to form an organic electrolyte capacitor.

EXAMPLES

Experiments carried out for examining characteristics of the coated electrode according to the present invention and the capacitor using such an electrode will hereinafter be described.

(Experiment 1)

Coated electrodes were produced by respectively using, as current collectors, an expanded metal made of aluminum, a punching metal made of aluminum and an electrolytically etched aluminum foil to conduct experiments examining characteristics of the respective coated electrodes.

A coating material prepared by adding and mixing ion-exchanged water with 87 parts by weight of activated carbon made of coconut shell having a specific surface area of 1,740 $m^2/g$ and an average particle diameter of 5 μm, 4 parts by weight of acetylene black powder, 6 parts by weight of SBR type binder and 3 parts by weight of carboxymethyl cellulose and having a solid content concentration of 30% was applied on to both surfaces simultaneously of each of the current collectors shown below under conditions of a coating speed of 2 m/min by means of a vertical double-side coater of die set system and dried under reduced pressure at 200° C. for 24 hours.

Incidentally, the air permeability of each current collector was measured by means of a B-type Gurley densometer according to JIS P 8117. The size of a specimen was about 50 mm×about 130 mm, and actual measurement was conducted in a circular region of a diameter of 28.7 mm and an available area of 645 $mm^2$. A time (s) required that 100 ml of air permeates through this available area was regarded as a value of the air permeability.

With respect to measurement of a hole diameter, a value actually measured through an optical microscope equipped with a scale was regarded as a hole diameter in the case where a base material was the expanded metal or punching metal, and in the case of the electrolytically etched foil, a dry particle image analyzer, Morphologi G2 (Product of SYSMEX CORPORATION) was used to irradiate a sample with light from one side and calculate out a hole diameter assuming that a hole is circular by data processing from a spread of transmitted light on the other side, thereby determining a hole diameter distribution of the sample.

Comparative Example 1

Expanded metal made of aluminum
Production process: Slits were made in a hard aluminum foil by a blade, and the foil was then stretched and rolled, thereby producing an expanded metal.
Thickness: 40 μm.
Wire diameter: 0.2 mm.
Hole diameter: 1.8 mm in length and 0.9 mm in breadth.
Width of base material: 500 mm.
Coating thickness: 151 μm.

Comparative Example 2

Punching metal made of aluminum
Production process: Holes were mechanically made in a hard aluminum foil by a punching die, and the foil was then pressed, thereby producing a punching metal.
Thickness: 40 μm.
Hole diameter: 1 mm.
Width of base material: 500 mm.
Coating thickness: 151 μm.

Comparative Example 3

Electrolytically etched aluminum foil
Production process: A soft aluminum foil was electrolytically etched in a hydrochloric acid etching bath, thereby producing an etched foil.
Thickness: soft foil of 100 μm.
Width of base material: 500 mm.
Coating thickness: 150 μm.

Example 1

Electrolytically etched aluminum foil
Production process: A hard aluminum foil was electrolytically etched in a hydrochloric acid etching bath, thereby producing an etched foil.
Thickness: hard foil of 40 μm.
Width of base material: 500 mm.
Coating thickness: 152 μm.

Example 2

Electrolytically etched aluminum foil
Production process: A hard aluminum foil was electrolytically etched in a hydrochloric acid etching bath, thereby producing an etched foil.
Thickness: hard foil of 45 μm.
Width of base material: 500 mm.
Coating thickness: 150 μm.

Results of the experiments are shown in Table 1. Air permeabilities in Comparative Examples 1 and 2 could not be measured by the measuring method as above because of their high opening rate and great hole diameter.

TABLE 1

| | Characteristics of current collector | | | | Characteristics of electrode | |
|---|---|---|---|---|---|---|
| | Apparent density [g/cc] | Opening rate [%] | Air permeability [s] | Ratio of a hole diameter of 1-30 μm [%] | Electrode density [g/cc] | Volume resistivity [Ω · cm] |
| Comparative Example 1 | 1.447 | 46 | — | 0 | 0.521 | $2.44 \times 10^{-2}$ |
| Comparative Example 2 | 1.752 | 35 | — | 0 | 0.526 | $1.86 \times 10^{-2}$ |
| Comparative Example 3 | 2.403 | — | 326 | 12 | 0.535 | $8.80 \times 10^{-5}$ |

TABLE 1-continued

| | Characteristics of current collector | | | Characteristics of electrode | |
|---|---|---|---|---|---|
| | Apparent density [g/cc] | Opening rate [%] | Air permeability [s] | Ratio of a hole diameter of 1-30 μm [%] | Electrode density [g/cc] | Volume resistivity [Ω · cm] |
| Example 1 | 2.496 | — | 35 | 92 | 0.544 | $3.70 \times 10^{-5}$ |
| Example 2 | 2.496 | — | 78 | 92 | 0.548 | $2.20 \times 10^{-5}$ |

From the experimental results, it is understood that when Examples 1 and 2 are compared with Comparative Examples 1 to 3, the coated electrodes according to Examples 1 and 2 are very smaller in volume resistivity than the coated electrodes according to Comparative Examples 1 to 3.

(Experiment 2)

The above-described coated electrodes were respectively used as positive electrodes to produce organic electrolyte capacitors in accordance with the following process and conduct experiments examining characteristics thereof.

Production of Electrode for Negative Electrode:

An expanded metal made of copper and having a width of 300 mm, a thickness of 20 μm, an opening rate of 45%, a hole diameter of 2.0 mm×0.9 mm and a basis weight of 110 mg/m² was used as a negative-electrode current collector, and a slurry prepared by adding and mixing ion-exchanged water with 87 parts by weight of carbon powder having a specific surface area of 16 m²/g and an average particle diameter of 4 μm, 4 parts by weight of acetylene black powder, 6 parts by weight of SBR type binder and 3 parts by weight of carboxymethyl cellulose and having a solid content concentration of 35% was applied on to both surfaces simultaneously of the current collector under conditions of a coating speed of 2 m/min by means of a vertical double-side coater of die set system and dried under reduced pressure at 200° C. for 24 hours, thereby producing an electrode for negative electrode.

Production of Capacitor:

Each of electrodes of 98×143 mm obtained by respectively cutting the coated electrodes obtained in Experiment 1 in such a manner that a coated portion is 98×128 mm, and an uncoated portion is 98×15 mm was used as a positive electrode, an electrode of 100×145 mm obtained by cutting the electrode for negative electrode in such a manner that a coated portion is 100×130 mm, and an uncoated portion is 100×15 mm was used as a negative electrode, such electrodes were arranged in such a manner that a weld of a connection terminal of the positive-electrode current collector and a weld of a connection terminal of the negative-electrode current collector are positioned on opposite sides, and stacked (22 separators, 11 negative electrodes and 10 positive electrodes) through a separator having a thickness of 50 μm in order of separator-negative electrode-separator-positive electrode, and 4 sides of the stacked electrodes were sealed with a tape to fabricate an electrode unit. The outermost layers of this electrode unit become negative electrodes on both sides, and separators are further arranged on the outsides thereof.

A metal foil made of lithium having a thickness of 260 μm was then cut so as to give a capacity of 550 mAh/g per the negative-electrode active material and stuck under pressure on a stainless steel mesh having a thickness of 40 μm, and the cut foil stuck on the mesh was then arranged on the separator on the upper side of the electrode unit so as to oppose to the negative electrode.

A positive electrode terminal made of aluminum and having a width of 50 mm, a length of 50 mm and a thickness of 0.2 mm, to which a sealant film had been thermally fused at sealing portions in advance, was stacked and ultrasonically welded to terminal welds of the positive-electrode current collectors (10 collectors) in the electrode unit. A negative electrode terminal made of copper and having a width of 50 mm, a length of 50 mm and a thickness of 0.2 mm, to which a sealant film had been thermally fused at sealing portions in advance, was also stacked and resistance-welded to terminal welds of the negative-electrode current collectors (11 collectors) in the electrode unit and the lithium metal foil current collector (1 collector).

The whole electrode unit was held between two sheathing aluminum-laminated films, the sheathing aluminum-laminated films were thermally fused at two sides of the terminal portions and another side, the electrode unit was then vacuum-impregnated with an electrolyte solution prepared by dissolving $LiPF_6$ in a propylene carbonate solvent and controlled to a concentration of 1 mol/l, and a side remaining without being fused was thermally fused under reduced pressure to vacuum-seal the electrode unit, thereby forming a laminate type capacitor. Ten cells were fabricated per specification.

When the capacitors fabricated are left at rest at room temperature, pre-dope progresses. One cell among the respective capacitors was disassembled every other day to examine whether the lithium metal is completely lost or not, thereby confirming days required of pre-dope. One cell among the capacitors, which had been confirmed that the pre-dope had been completed, was selected, a constant current of 2 A was applied until a cell voltage reached 3.8 V, and a constant voltage of 3.8 V was then applied to conduct constant current-constant voltage charge for 1 hour.

Discharge was then conduced at a constant current of 1 A until the cell voltage was lowered to 2.2 V. This cycle of 3.8 V-2.2 V was repeated to evaluate a cell capacity and an energy density upon the third discharge. The results thereof are shown in Table 2.

TABLE 2

| Sample capacitors | Positive-electrode used | Thickness of cell [mm] | Days required of pre-dope [days] | Internal resistance [mΩ] | Cell capacity [mAh] | Energy density [Wh/l] |
|---|---|---|---|---|---|---|
| Comparative Example 4 | Comparative Example 1 | 4.8 | 4 | 11.6 | 458 | 19.6 |
| Comparative Example 5 | Comparative Example 2 | 4.8 | 5 | 12.3 | 459 | 19.6 |
| Comparative Example 6 | Comparative Example 3 | 5.5 | 12 | 4.5 | 454 | 16.9 |
| Example 3 | Example 1 | 4.8 | 3 | 4.4 | 463 | 19.8 |
| Example 4 | Example 2 | 5.2 | 8 | 4.2 | 452 | 17.8 |

From the experimental results shown in Table 2, it is understood that when Examples 3 and 4 are compared with Comparative Examples 4 and 5, the capacitors according to Examples 3 and 4 are very small in internal resistance compared with the capacitors according to Comparative Examples 4 and 5.

It is also understood that when Examples 3 and 4 are compared with Comparative Example 6, the capacitors according to the Examples are short in the time required of pre-dope and also high in energy density compared with the capacitor according to the Comparative Example. From the above-described experiment, it is understood that the electrode according to Example 1 is suitable for a positive electrode.

(Experiment 3)

An experiment was conducted to examine a difference in characteristics between electrodes when a coating material for electrode layer was directly applied to an expanded metal made of aluminum and an electrolytically etched aluminum foil and when the coating material was applied after a conductive coating material was primed.

As the conductive coating material, was used an aqueous slurry (viscosity: 500 mPa·s) comprising 95 parts by weight of carbon powder (average particle diameter: 4.5 μm) and 5 parts by weight of carboxymethyl cellulose and having a solid content concentration of 30%.

As the coating material for electrode layer, was used a slurry prepared by adding and mixing ion-exchanged water with 87 parts by weight of phenolic activated carbon having a specific surface area of 2,030 m²/g and an average particle diameter of 4 μm, 4 parts by weight of acetylene black powder, 6 parts by weight of SBR type binder and 3 parts by weight of carboxymethyl cellulose and having a solid content concentration of 35%.

When the coating material for electrode layer was directly applied, double-side concurrent coating was conducted at a coating speed of 3 m/min by means of a vertical double-side coater of die set system so as to achieve a target coating thickness of 150 μm in total on both sides, and drying was then conducted under reduced pressure at 200° C. for 24 hours, thereby obtaining a coated electrode of 100 m. When the conductive coating material was primed on the other hand, double-side concurrent coating was first conducted with the conductive coating material at a coating speed of 4 m/min by means of a vertical double-side coater of die set system so as to achieve a target coating thickness of 20 μm in total on both sides, drying was conducted under reduced pressure at 200° C. for 24 hours, double-side concurrent coating was then conducted with the coating material for electrode layer at a coating speed of 3 m/min by means of a vertical double-side coater of die set system so as to achieve a target coating thickness of 150 μm in total on both sides, and drying was conducted under reduced pressure at 200° C. for 24 hours, thereby obtaining a coated electrode of 100 m. The thickness of the primed conductive layer had a precision of 20±2 μm. Experimental conditions were as follows.

Comparative Example 7

Expanded metal made of aluminum
Production process: Slits were made in a hard aluminum foil by a blade, and the foil was then stretched and rolled, thereby producing an expanded metal.
Thickness: 30 μm.
Wire diameter: 0.2 mm.
Opening rate: 46%.
Width of base material: 500 mm.
Conductive coating material priming: not conducted.
Coating thickness of electrode layer: 150 μm.

Comparative Example 8

Expanded metal made of aluminum
Production process: Slits were made in a hard aluminum foil by a blade, and the foil was then stretched and rolled, thereby producing an expanded metal.
Thickness: 30 μm.
Wire diameter: 0.2 mm.
Opening rate: 46%.
Width of base material: 500 mm.
Priming thickness of conductive coating material: 20 μm.
Coating thickness of electrode layer: 151 μm.

Example 5

Electrolytically etched aluminum foil
Production process: A hard aluminum foil was electrolytically etched in a hydrochloric acid etching bath, thereby producing an etched foil.
Thickness: etched hard foil of 30 μm.
Hole diameter: 80% or more of through-holes were 1 to 30 μm.
Width of base material: 500 mm.
Conductive coating material priming: not conducted.
Coating thickness of electrode layer: 152 μm.

Example 6

Electrolytically etched aluminum foil
Production process: A hard aluminum foil was electrolytically etched in a hydrochloric acid etching bath, thereby producing an etched foil.
Thickness: etched hard foil of 30 μm.
Hole diameter: 80% or more of through-holes were 1 to 30 μm.
Width of base material: 500 mm.
Priming thickness of conductive coating material: 20 μm.
Coating thickness of electrode layer: 150 μm.

TABLE 3

| | Characteristics of base materials | | | | | | | | |
|---|---|---|---|---|---|---|---|---|---|
| Sample | Thickness [μm] | Apparent density [g/cc] | Opening rate [%] | Air permeability [s] | Ratio of a hole diameter of 1-30 μm [%] | Coating thickness of conductive layer [μm] | Coating thickness of electrode layer [μm] | Electrode density [g/cc] | Volume resistivity [Ω·cm] |
| Comparative Example 7 | 30 | 1.447 | 46 | — | 0 | none | 150 | 0.521 | $2.44 \times 10^{-2}$ |
| Comparative Example 8 | 30 | 1.447 | 46 | — | 0 | 20 | 151 | 0.526 | $8.56 \times 10^{-4}$ |

TABLE 3-continued

| | Characteristics of base materials | | | | | | | | |
|---|---|---|---|---|---|---|---|---|---|
| Sample | Thickness [μm] | Apparent density [g/cc] | Opening rate [%] | Air permeability [s] | Ratio of a hole diameter of 1-30 μm [%] | Coating thickness of conductive layer [μm] | Coating thickness of electrode layer [μm] | Electrode density [g/cc] | Volume resistivity [Ω · cm] |
| Example 5 | 30 | 2.496 | — | 28 | 92 | none | 152 | 0.544 | $7.50 \times 10^{-5}$ |
| Example 6 | 30 | 2.496 | — | 28 | 92 | 20 | 150 | 0.548 | $7.20 \times 10^{-5}$ |

From the experimental results shown in Table 3, it is understood that when Examples 5 and 6 are compared with Comparative Examples 7 and 8, the coated electrodes according to Examples 5 and 6 are very smaller in volume resistivity than the coated electrodes according to Comparative Examples 7 and 8. It is also understood that when Example 5 is compared with Example 6, the volume resistivities of both electrodes are equivalent. Accordingly, it was confirmed from these experimental results that the step of priming the conductive coating material can be omitted in the formation of the coated electrode according to the present invention, and a coated electrode small in volume resistivity is obtained without conducting priming.

(Experiment 4)

An experiment was conducted to fabricate a wound cylindrical capacitor in accordance with the construction shown in FIG. 3 and evaluate the cell capacity and energy density thereof.

The capacitor used in the experiment was fabricated in the following manner.

First, an electrode obtained by cutting the coated electrode according to Example 5 into the size of 54 mm×345 mm (coated portion: 330 mm; uncoated portion: 15 mm) was used as a positive electrode of the capacitor, and an electrode obtained by cutting the electrode for negative electrode produced in Experiment 2 into the size of 56 mm×376 mm (coated portion: 361 mm; uncoated portion: 15 mm) was provided as a negative electrode.

An aluminum-made terminal having a width of 4 mm, a length of 50 mm and a thickness of 0.1 mm and a copper-made terminal having a width of 4 mm, a length of 50 mm and a thickness of 0.1 mm were welded to the respective uncoated portions of the positive electrode and the negative electrode in such a manner that both terminals respectively extend to opposite sides.

A cellulose/rayon mixed nonwoven fabric having a thickness of 35 μm was further used as a separator, and the electrodes and the separator were cylindrically wound to fabricate a wound electrode unit.

A metal foil made of lithium having a thickness of 260 μm and a width of 50 mm was then cut so as to give a capacity of 550 mAh/g per the negative-electrode active material and stuck under pressure on a copper mesh having a thickness of 25 μm, the cut foil stuck on the mesh was stuck on the outermost periphery of the wound electrode unit with a polyimide tape, and a leading edge of the copper mesh was weld to the copper-made negative terminal.

The unit was inserted into a cylinder having an inner diameter of 18 mm and a height of 650 mm, an electrolyte solution prepared by dissolving $LiPF_6$ in a propylene carbonate solvent and controlled to a concentration of 1 mol/l was poured, the positive terminal was welded to an aluminum cap, the negative terminal was welded to a steel can plated with nickel, and the cap portion was sealed to fabricate a wound cylindrical capacitor. In such a manner, two wound cylindrical capacitors in total were fabricated.

Prior to use in Experiment 4, the wound cylindrical capacitors were left to stand for 7 days at room temperature, and one capacitor was then disassembled to confirm that the lithium metal is completely lost. This indicates that pre-dope has been completed. A constant current of 1 A was applied to the other capacitor until a cell voltage reached 3.8 V, and a constant voltage of 3.8 V was then applied to conduct constant current-constant voltage charge for 1 hour. Discharge was then conducted at a constant current of 1 A until the cell voltage was lowered to 2.2 V. This cycle of 3.8 V-2.2 V was repeated to evaluate a cell capacity and an energy density upon the third discharge. The results thereof are shown in Table 4.

TABLE 4

| | Internal resistance [mΩ] | Cell capacity [mAh] | Energy density [Wh/l] |
|---|---|---|---|
| Cylindrical capacitor | 47 | 103.2 | 14.7 |

From the experimental results shown in Table 4, it is understood that a high energy density is achieved even in the wound cylindrical capacitor like the stacked type.

As described above, the coated electrode according to the present invention is industrially producible, high in conductivity and strength and excellent in evenness.

The organic electrolyte capacitor according to the present invention retains a high energy density, and at the same time has high power, a low internal resistance and high reliability. In addition, the production process thereof can be simplified, so that high productivity is achieved.

The above-described embodiments are only a part of embodiments of the present invention and do not limit the technical scope of the present invention. For example, a specific combination of the binders for active material layer, a specific positive-electrode active material and a specific negative-electrode active material are used, whereby the above effects can be more optimized or improved.

The present invention can be effectively used as a driving storage power source or an auxiliary storage power source for electric vehicles, hybrid electric vehicles, fuel cell vehicles, motor-driven bicycles, motor-driven scooters, motorized wheelchairs, etc. In addition, the present invention can also be used in, for example, various kinds of energy storage systems such as power capacitors of solar energy and power capacitors of wind power generation, or uninterruptive power supply systems, storage power sources for household electric appliances or storage power sources for various kinds of industrial machines. However, the present invention is not limited thereto, and may be applied to a wider variety of fields. These applications and modifications are all included in the mode of the invention of the present application.

The invention claimed is:

1. A coated electrode comprising a current collector composed of an etched aluminum foil having a thickness of 20 to 45 μm, an apparent density of 2.00 to 2.54 g/cm$^3$, an air permeability of 20 to 120 s and a great number of through-holes penetrating therethrough from the front surface to the back surface, and an electrode layer formed by applying a coating material containing, as an active material, a substance capable of reversibly carrying lithium ions and anions on to the current collector.

2. The coated electrode according to claim 1, wherein at least 80% of the through-holes in the current collector have a hole diameter of 1 to 30 μm.

3. The coated electrode according to claim 1, wherein the electrode layer has a thickness of 20 to 200 μm and is formed on one or both surfaces of the current collector.

4. The coated electrode according to claim 1, wherein the coating material contains an aqueous binder.

5. An organic electrolyte capacitor comprising a positive electrode, a negative electrode and an electrolyte capable of transferring lithium ions, wherein the positive electrode is composed of the coated electrode according to claim 1, and the negative electrode has a current collector containing, as a negative-electrode active material, a substance capable of reversibly carrying lithium ions and having a great number of through-holes penetrating therethrough from the front surface to the back surface, and a negative-electrode active material layer formed on the current collector, whereby lithium is electrochemically carried on the negative electrode.

6. The organic electrolyte capacitor according to claim 5, wherein an electrolyte solution containing the electrolyte is an aprotic organic solvent solution of a lithium salt.

7. The organic electrolyte capacitor according to claim 5, which is constructed by stacking electrode pairs each composed of the positive electrode and the negative electrode.

8. The organic electrolyte capacitor according to claim 5, which is constructed by winding electrode pairs each composed of the positive electrode and the negative electrode.

* * * * *